United States Patent
Grenot

(10) Patent No.: US 8,126,004 B2
(45) Date of Patent: Feb. 28, 2012

(54) METHOD FOR OPTIMISING THE SHARING OF A PLURALITY OF NETWORK RESOURCES BETWEEN A PLURALITY OF APPLICATION FLOWS

(75) Inventor: Thierry Grenot, Meudon (FR)

(73) Assignee: Ipanema Technologies, Fontenay-Aux-Roses (FR)

( * ) Notice: Subject to any disclaimer, the term of this patent is extended or adjusted under 35 U.S.C. 154(b) by 190 days.

(21) Appl. No.: 12/517,454

(22) PCT Filed: Dec. 19, 2007

(86) PCT No.: PCT/EP2007/064172
§ 371 (c)(1),
(2), (4) Date: Jun. 3, 2009

(87) PCT Pub. No.: WO2008/074817
PCT Pub. Date: Jun. 26, 2008

(65) Prior Publication Data
US 2010/0067542 A1    Mar. 18, 2010

(30) Foreign Application Priority Data

Dec. 20, 2006    (FR) ...................................... 06 55722

(51) Int. Cl.
*H04L 12/28*    (2006.01)
(52) U.S. Cl. ........................................ 370/431; 370/252
(58) Field of Classification Search .................. 370/431, 370/252, 253, 229–236
See application file for complete search history.

(56) References Cited

U.S. PATENT DOCUMENTS

| 5,359,593 A | 10/1994 | Derby et al. |
| 2006/0092936 A1* | 5/2006 | Luss ............................... 370/389 |
| 2008/0304414 A1* | 12/2008 | Grenot et al. ................. 370/235 |

FOREIGN PATENT DOCUMENTS

| FR | 2 842 677 A1 | 1/2004 |
| FR | 2842677 | * 1/2004 |

OTHER PUBLICATIONS

International Search Report for PCT/EP2007/064172, Feb. 8, 2008.
Proust C. "An Approach for Routing At Flow Level"; draft-proust-flow-routing-00.txt; Internet Citation (online); Feb. 2004.
Dutta D et al. "An Active Proxy Based Architecture for TCP in Heterogeneous Variable Bandwidth Networks"; Globecom' 01, 2001 IEEE Global Telecommunications Conference, San Antonio TX; Nov. 25-29, 2001; pp. 2316-2320.

* cited by examiner

*Primary Examiner* — Gary Mui
(74) *Attorney, Agent, or Firm* — Pearne & Gordon LLP

(57) ABSTRACT

The invention relates to a method for optimising the sharing of a plurality of network resources between a plurality of data flows generated by a plurality of applications, said flows being able to take a number n of paths [ABi], i=1 to n, linking at least one site A and at least one site B in a telecommunications network (6).

The method according to the invention consists in modifying the distribution of the flows on the paths [ABi], i=1 to n, in such a way as to balance the Effective Demand Densities of the available paths.

24 Claims, 7 Drawing Sheets

METHOD FOR OPTIMISING THE SHARING OF A PLURALITY OF NETWORK RESOURCES BETWEEN A PLURALITY OF APPLICATION FLOWS

TECHNICAL FIELD

This invention relates to the field of telecommunications and relates more specifically to a method for optimising the sharing of a plurality of network resources between a plurality of data flows generated by a plurality of applications, said flows being able to take a number n of paths [ABi], i=1 to n, linking at least one site A and at least one site B in a telecommunications network.

The invention also relates to a device and software adapted to implement the method.

This method and this device can be implemented regardless of the geographical extent of the network, regardless of the speed carried by the latter and regardless of the number of users of this network.

PRIOR ART

Packet mode telecommunication networks are characterised in that the information carried is carried in groups called packets comprised substantially of a header containing the information for the routing of the packet in the network and the data to be transmitted.

Addressing information is inserted into the headers in order to allow for the identification of information flows by the final applications. The packets are carried across the network, and take varied means of transmitting and of switching over this network.

The main technology currently implemented for these packet mode telecommunication networks is the IP protocol (Internet Protocol). This protocol is used from end to end, and can be used over highly diverse transmission networks. An example of a packet mode network is the Internet network, operating with the IP protocol. Examples of means of transmitting and of switching associated with the IP protocol are Ethernet, ISDN (for Integrated Services Digital Network), FR (for Frame Relay), ATM (for Asynchronous Transfer Mode), SDH (for Synchronous Digital Hierarchy), SONET (for Synchronous Optical Network), MPLS (for Multiprotocol Label Switching), and DWDM (for Dense Wavelength Digital Multiplexing) networks, etc.

A usage example of a network operating with the IP protocol is comprised of VPN (for Virtual Private Networks). These networks offer an interconnection at the IP level in a private manner for a given group of users (typically a company or an organisation having several establishments), while using a shared network infrastructure (Internet for example).

The packets are typically emitted by a large number of sources operating independently from each other, towards a large number of destinations also operating independently from each other.

FIG. 1 provides an example of such a network 2.

The users 4 can be either individual users, or agencies, companies with their own internal local network, etc.

The transit network 6 shows the central portion, generally of high capacity and covering a wide territory (the entire world in the case of the Internet network). This network is generally shared by a multitude of users and/or of private networks.

The access networks 8 are generally of a slow or average speed, and are shared between users located in a limited geographical zone. The "local loop", wired, optical, radio, etc. link between the user and the access service provider is considered in what follows as being a part of the access network.

FIG. 2 shows different possible cases of access networks. The shorthand conventions are as follows:

For the Networks:

Carrier: transporter of large quantities of information over long distances; it also realises the interconnection with other carriers, as such making possible in the case of the Internet network an interoperability between the users of the various ISPs (Internet Service Providers).

IAP: (Internet Access Provider) a provider of access to the network; it collects the traffic for the ISP, the latter typically provides its users with diverse servers for authentication, Website hosting, pricing, messaging, etc. as well as the access to the transit network.

Local loop: link (wired, optical, radio, etc.) linking the user to the network.

TELCO: telephone operator, often owner of the local loop.

For the Equipment:

CPE: (Customer Premises Equipment) user equipment connected to the network (in general an access router).

MUX: multiplexer/demultiplexer (there are many types of these: telephonic, xDSL, SDH, etc.).

NAS: (Network Access Server) access server to the network; which can also be an access router.

R: Router (or switch).

It can be seen that a large number of configurations are possible. Each of the pieces of equipment (CPE, MUX, NAS, R, etc.) corresponds to a function of concentrating traffic and of mutualising telecommunications resources.

With the prodigious development of information exchanges across the telecommunication networks, it is becoming essential for the operators to ensure a Quality of Service for their customers. The Quality of Service is comprised of all of the pertinent characteristics that affect the transfer of information between two given points of a network. There exists in particular:

quality of the access to the service;
the availability of the service;
the time for service restoration in the event of failure.
quality of the information transfer service;
the transfer delay of the information between the source and the destination;
the variation of the transfer delay of the information (jitter);
the degradation of the information carried (losses, errors).

The Quality of Service is mainly linked to the state of congestion of the different elements of the network taken by the information during their transfer. Although there is an infinity of gradations, the operating cases encountered by these two modes can be expressed schematically as follows:

either there is no resource reservation, and the network does its best to relay the information to the addressee;
or there is a resource reservation, and the quantity of information injected into the network is more or less statistically controlled.

In any case, queued temporary storage systems (memories), located at each point of multiplexing, of concentration or of switching, make it possible to process the simultaneousness of packet arrivals. The instant memory occupation rate encountered by a packet and the management policy (priority, number of queues, rule for dumping, rejection, etc.) implemented on each queue determine the time spent by a packet in this device, as well as its possible rejection.

End-to-End Performance

The end-to-end performance, such as it is observed by the applications that are the source of the flows and the users (human or machine) using these applications depends not, only on the sizing of the network, but also on the mechanisms for managing traffic implemented in the network. Some of these mechanisms are highly general and have an operation with high granularity, others are very fine, and have an operation that is differentiated flow by flow. The productivity of these applications is highly linked to the technical characteristics of the end-to-end network, such as delays, losses and capacity for exchange in terms of bandwidth.

Congestion

The links between sites undergo a load that is variable according, on the one hand to the quantity of communications that is carried, and on the other hand to the effective behaviour of each of these communications.

The load presented can of course be higher than the capacity of the link: this is what is referred to as congestion.

In situations of congestion, it is the network that becomes the preponderant element in terms of performance from end to end of the applications. It is therefore necessary, either to avoid congestions by oversizing the network, or to manage the congestions in such a way as to not degrade the performance below a predetermined threshold.

Elasticity of the Application Flows

The application flows generated can have different behaviours according to the nature of the application that generates them as well as according to the characteristics of the network. A factor that is particularly important to take into account is the elasticity of the flows, i.e. their capacity to more or less use the network resource, in particular the bandwidth, made available to them.

This characteristic is linked on the one hand to the very nature of the application, and on the other hand to the type of end-to-end protocol which is used. For example, the flows exchanged by the UDP protocol are in general not elastic, while those which are exchanged via the TCP protocol are in general of average or of high elasticity.

As such, for example:
- a real time flow is in general practically not elastic: it does not adapt to the network resource made available to it. This results in the fact that this flow will not be able to adapt correctly to an insufficient resource, and that the application therefore does not function in this situation. In addition, if the resource is in excess, the application will not use the additional resource available. An example of a non-elastic real time source application is the carriage of voice.
- a transactional flow is of average elasticity: it adapts to an average degree to the resource made available to it. This results in that if the resource is insufficient, the transactions take a long time to execute and, if the resource is in excess, the application will use additional resource only to a limited degree. An example of a source application with elastic transactional flow is the key-entry of a form.

On the other hand, a data transfer flow is most often characterised by a high degree of elasticity: it adapts to the resource made available to it. When the resource is insufficient, the time taken for the transfer will increase, but inversely this flow will be able to use a large network resource, and as such reduce the time taken for the data transfer. An example of a source application with elastic transfer flow is file copying.

Cost of the Network

The cost of the network, whether for the operator of the network or for a customer that purchases the service from the operator, is for a major portion linked to the level of the resource, in particular the speed, available for transporting application flows between different users. Generally, the higher the available speed, the more expensive the network is. As such, in order to control the cost of the network, its sizing should be limited in such a way as to best use the resource available.

Problem of Choosing the Best Link

In a certain number of cases, it can be interesting to have several links available between the source sites and the destination sites so as, for example, to increase the availability of the sites connected together as such, or to increase the total resource available on the site.

Generally, these different links can have different characteristics:
- the speed: for example, costly access at a low speed and inexpensive access at a high speed;
- the performance: for example, the transit time and the probability of losing information;
- the instant load;
- the level of security: for example a MPLS primary access (for Multiprotocol Label Switching) and a secondary access of the Internet type;
- the availability (probability of a complete breakdown of an access)
- etc.

On the other hand, the different communications can have requirements of different levels (performance, availability, security, etc.) according to the type of applications and of the sensitivity of the information exchanged.

The question then arises of deciding the best distribution of the application flows between the links available, in order to obtain the best cost/performance compromise.

FIG. 3 shows the general relation between the application performance and the level of the resource allocated in order for the application to exchange its data: there are three distinct zones, a first zone Z1 of under capacity, a second zone Z2 of adapted capacity, and a third zone Z3 of over capacity. Between the first zone Z1 and the third zone Z3, the productivity of an application increases with the network performance, then reaches a ceiling at an asymptote value corresponding to the zone of over capacity. It is for example useless for a transaction to be able to be executed faster than the key-entry operations that trigger it. These zones depend for a large part on the methods for managing the traffic implemented in the network as well as the type of the applications exchanging information. An over capacity leads to an excessive operating cost, and under capacity leads to poor productivity.

Solutions known in the prior art to resolve this problem are based on the use of different criteria used independently or combined together, such as for example:
- static distribution, consisting in directing the flows being directed according to the type of the application (or to the identity of the transmitter or of the receiver) which generates the data comprising these flows,
- statistic distribution, wherein each new flow has a probability defined on one of the available links,
- dynamic distribution consisting in directing the flows according to the average load of the links
- etc.

These mechanisms achieve their purpose only imperfectly, in particular due to the elastic nature of the majority of the application flows: the links tend to be loaded (congested) by a low number of elastic application flows, and all of the flows are distributed independently in terms of the impact of this congestion on the different applications.

Another known solution consists in oversizing the links. However, it is very difficult to determine the network capacity actually needed according to the objectives of the entity using this network. For example in a company, "comfort" flows such as personal access to the Internet, on-line music, high-volume attachments in electronic mail, etc. will compete with more important applications (business applications, monetics, etc.) in terms of the company, without it being possible to simply adjust the balance.

In addition to its extra cost, chronic oversizing encourages "bad practices" of using the network, which leads to a regular increase in the proportion of non-critical flows over the network.

The purpose of the invention is to ensure a distribution of the load that makes it possible to best control the end-to-end performances, the cost of the network, the sizing of the network capacity, and the various states of congestion in such a way as to obtain an optimal use of the resources of the network while still guaranteeing productivity of the applications generating the flows exchanged via the network.

DESCRIPTION OF THE INVENTION

This purpose is achieved by means of a method for optimising the sharing of a plurality of network resources between a plurality of data flows generated by a plurality of applications, said flows being able to take a number n of paths [ABi], i=1 to n, linking at least one site A and at least one site B in a telecommunications network.

The method according to the invention comprises:
a first phase consisting in determining at each instant t for each flow a value U(t) representing the use by said flow of at least one network resource from among the plurality of network resources available, a value D(t) representing the demand of network resources required and sufficient in order for the flow to satisfy a pre-established performance objective for said application, and a value C(t) representing a constraint limiting the network resource that can be attributed to the flow in question,
a second phase consisting in:
calculating, according to said values U(t), D(t) and C(t), a value DE(t) representing the quantity of network resources effectively required at an instant t in order to satisfy the performance objective of said flow according to the Constraint C(t), the type of application generating said flow and the type of use of said application, and in
calculating according to the different values DE(t), and for each transmission path [ABi], i=1 to n, a value $DDE_i(t)$ representing the Effective Demand Density on said path by taking into account all of the flows exchanged between the sites A and B,
a third phase consisting in dynamically distributing the flows generated by the different applications between the different paths [ABi], i=1 to n, according to the Effective Demand Densities $DDE_i(t)$ on the paths [ABi], i=1 to n.

The value $DDE_i(t)$ characterises the Effective Demand on the resource in question with regard to the capacity of the path.

According to the invention, for each flow exchanged between the sites A and B, the regulation phase comprises the following steps:
measuring the value of the Use U(t),
determining the value of the Demand D(t),
determining the value of the Constraint C(t),
calculating the value of the Effective Demand DE(t),
calculating Effective Demand densities $DDE_i(t)$ on each path [ABi], i=1 to n, taking into account all of the flows exchanged between the sites A and B,
modifying the distribution of the flows on the paths [ABi], i=1 to n, in such a way as to balance Effective Demand Densities on the available paths.

The method according to the invention also applies for routing one or several newly-generated flow towards the best path, i.e. the path that will have the smallest Effective Demand Density from among all of the possible paths once the routing has been carried out.

In this case, the regulation phase comprises a discontinuous process comprising the following steps:
when a new flow that has to be exchanged between the site A and the site B appears:
identifying the type of the application that is generating said new flow,
determining the value D(t) initially associated with this new flow,
carrying out a projection of the Effective Demand Density $DDE_i(t)$ on each path [ABi], i=1 to n, in the hypothesis where the new flow would take each one of said paths,
routing the new flow towards the path having the smallest projection of Effective Demand Density $DDE_i(t)$.

The projection of the Effective Demand Density on the available paths is an estimate of what would be the Effective Demand Density on these paths if the new application flow were to take them.

Note that the distribution of the flows between the different paths [ABi], i=1 to n, is furthermore carried out according to the level of security of each one of said paths [ABi], i=1 to n, and/or of the level of quality provided by each one of said paths [ABi], i=1 to n, and/or of the financial cost of using each one of said paths [ABi], i=1 to n.

In an alternative implementation of the method according to the invention, each flow exchanged between the sites A and B is an aggregate of several individual flows.

In this alternative, the individual flows are aggregated according to the topology of the network, and/or of the typology of the flows, and/or of the number of flows for each application, and/or of the criticality of each flow.

In an application example of the method according to the invention, the network resource shared between the different flows shows the total bandwidth available for exchanging these flows during a communication between the sites A and B.

In this application, the value U(t) shows the speed effectively used to transmit a flow between the sites A and B, the value D(t) shows the speed required and sufficient in order for the generated flow to satisfy the pre-established performance objective associated with the application generating said flow, the value C(t) shows the maximum value for the speed authorised by the network for transmitting the flow in question, and the value DE(t) shows an estimation of the speed of the speed effectively required in order for said flow to satisfy its performance objective by taking into account its characteristics of elasticity.

The value DE(t) is defined in the following way:
in the absence of speed limitation (application flow not constrained by the network), $$DE(t)=\text{Min}[U(t),D(t)]; \text{ and}$$

in the presence of speed limitations (application flow constrained by the network at the value C(t)):
when C(t) is greater than D(t), there is also $$DE(t)=\text{Min}[U(t),D(t)],$$

However, it can be noted that, as by definition of the Constraint C(t) we have U(t)~C(t) and that on the other hand C(t)>D(t), there is finally:

$$DE(t)=D(t) \quad (5)$$

and
when C(t) is less than or equal to D(t), only an estimate a priori can be made of the Effective Demand DE(t):

$$DE(t)=D(t) \quad (10)$$

In this embodiment, for a given path [ABi], i=1 to n, of available bandwidth BWi, taken by a plurality of flows $F_j$, j=1 to F, the value of the Effective Demand Density $DDE_i(t)$ at the instant t is equal to the sum of the Effective Demands $DE_j(t)$ of each flow divided by the total bandwidth $BW_i$ of said path:

$$DDE_i(t)=[\Sigma_{(j=1 \text{ to } F)} DE_j(t)]/BW_i.$$

In the event of new flows that are to be exchanged between the sites A and B, if it is supposed that the Effective Demand Density of each path $DDE_i(t)$ is already determined, the projection of Effective Demand Density for the path at the time of the arrival of the new flow (nf) is calculated as follows:

$$Proj[DDE_i(t)]=DDE_i(t)+Dnf(t)/BW.$$

It is then noted that:
Proj[$DDE_i(t)$] less than 100% indicates that the path is under-loaded, and therefore capable of accommodating the new application flow while continuing to satisfy the performance of those already present,
Proj[$DDE_i(t)$] greater than or equal to 100% indicates that the path is overloaded, and that it cannot attribute enough resources to satisfy the performance of all of the flows.

In this case, it is possible either to reduce the priority of certain flows, deemed less critical, in order to protect others, deemed more critical, or to constrain all of the flows in an identical manner.

The method according to the invention is implemented using a device comprising:
means for determining at each instant t for each flow a value U(t) representing the use per said flow of at least one network resource from among the plurality of network resources available, a value D(t) representing the demand of network resources required and sufficient in order for the flow to satisfy a pre-established performance objective for said application, and a value C(t) representing a constraint limiting the network resource attributable to the flow in question, and for calculating, according to said values U(t), D(t) and C(t), a value DE(t) representing the network resource effectively required at an instant t in order for said flow to satisfy the performance objective in the presence of the Constraint C(t), of the type of the application generating said flow and of the type of use of said application,
means for calculating according to the different values DE(t), and for each transmission path [ABi], i=1 to n, a value $DDE_i(t)$ representing the Effective Demand Density on said path by taking into account all of the flows exchanged between the sites A and B and for dynamically distributing the flows generated between the different paths [ABi], i=1 to n, according to the Effective Demand densities $DDE_i(t)$ of the paths [ABi], i=1 to n.

According to the invention, said means comprise:
said means 19 comprise:
a module for measuring the value U(t) for each flow exchanged during a communication between the site A and the site B,
a module for determining the value D(t),
a module for determining the value C(t),
a module for calculating the value DE(t),
a module for calculating the Effective Demand densities $DDE_i(t)$ on each path [ABi], i=1 to n, by taking into account all of the flows exchanged between the sites A and B,
a module for distributing the flows on the paths [ABi], i=1 to n, in such a way as to balance the Effective Demand Densities of the paths available.

Preferentially, said means further comprise:
a module for identifying a new flow exchanging information between the site A and the site B,
a module for determining the value D(t) initially associated with this new flow,
a module for carrying out a projection of the Effective Demand Density on each path [ABi], i=1 to n, in the hypothesis where the new flow would take each one of said paths,
a module for routing the new flow towards the path i having the smallest projection of Effective Demand density $DDE_i(t)$.

The method according to the invention is implemented by means of a software stored on a media that can be connected to a telecommunications network adapted for the optimisation of the sharing of a plurality of network resources between a plurality of data flows generated by a plurality of applications, said flows being able to take a number n of paths [ABi], i=1 to n, linking at least one site A and at least one site B in a telecommunications network.

This software comprises:
instructions for determining at each instant t for each flow a value U(t) representing the use by said flow of at least one network resource from among the plurality of network resources available, a value D(t) representing the demand of network resources required and sufficient in order for the flow to satisfy a pre-established performance objective for said application, and a value C(t) representing a constraint limiting the network resource that can be attributed to the flow in question, and
instructions for:
calculating, according to said values U(t), D(t) and C(t), a value DE(t) representing the quantity of network resources effectively required at an instant t in order to satisfy the performance objective of said flow according to the Constraint C(t), the type of application generating said flow and the type of use of said application, and in
calculating according to the different values DE(t), and for each transmission path [ABi], i=1 to n, a value $DDE_i(t)$ representing the Effective Demand Density on said path by taking into account all of the flows exchanged between the sites A and B, and
instructions for dynamically distributing the flows generated by the different applications between the different paths [ABi], i=1 to n, according to the Effective Demand densities $DDE_i(t)$ on the paths [ABi], i=1 to n,
instructions for measuring the value U(t) for each flow exchanged during a communication between the site A and the site B,
instructions for determining the value D(t),
instructions for determining the value C(t),
instructions for calculating the value DE(t),
instructions for calculating the respective Effective Demand Densities $DDE_i(t)$ of each path [ABi], i=1 to n, for all of the flows exchanged between the sites A and B, instructions for distributing the flows on the paths [ABi], i=1 to n, in such a way as to balance the Effective Demands Densities on the available paths.

In a preferred embodiment, the software according to the invention further comprises:
instructions for identifying a new flow to be exchanged between the site A and the site B,
instructions for measuring the value D(t) initially associated with this new flow,
instructions for calculating a projection of the Effective Demand Density $DDE_i(t)$ of each path [ABi], i=1 to n, in the hypothesis where the new flow would take each one of said paths,
instructions for routing the new flow towards the path i having the smallest projection of the Effective Demand Density $DDE_i(t)$.

BRIEF DESCRIPTION OF THE DRAWINGS

Other characteristics and advantages of the invention will emerge from the following description, taken by way of a non-limiting example, in reference to the annexed figures wherein.

DETAILED DESCRIPTION OF PARTICULAR EMBODIMENTS

Figure 1:
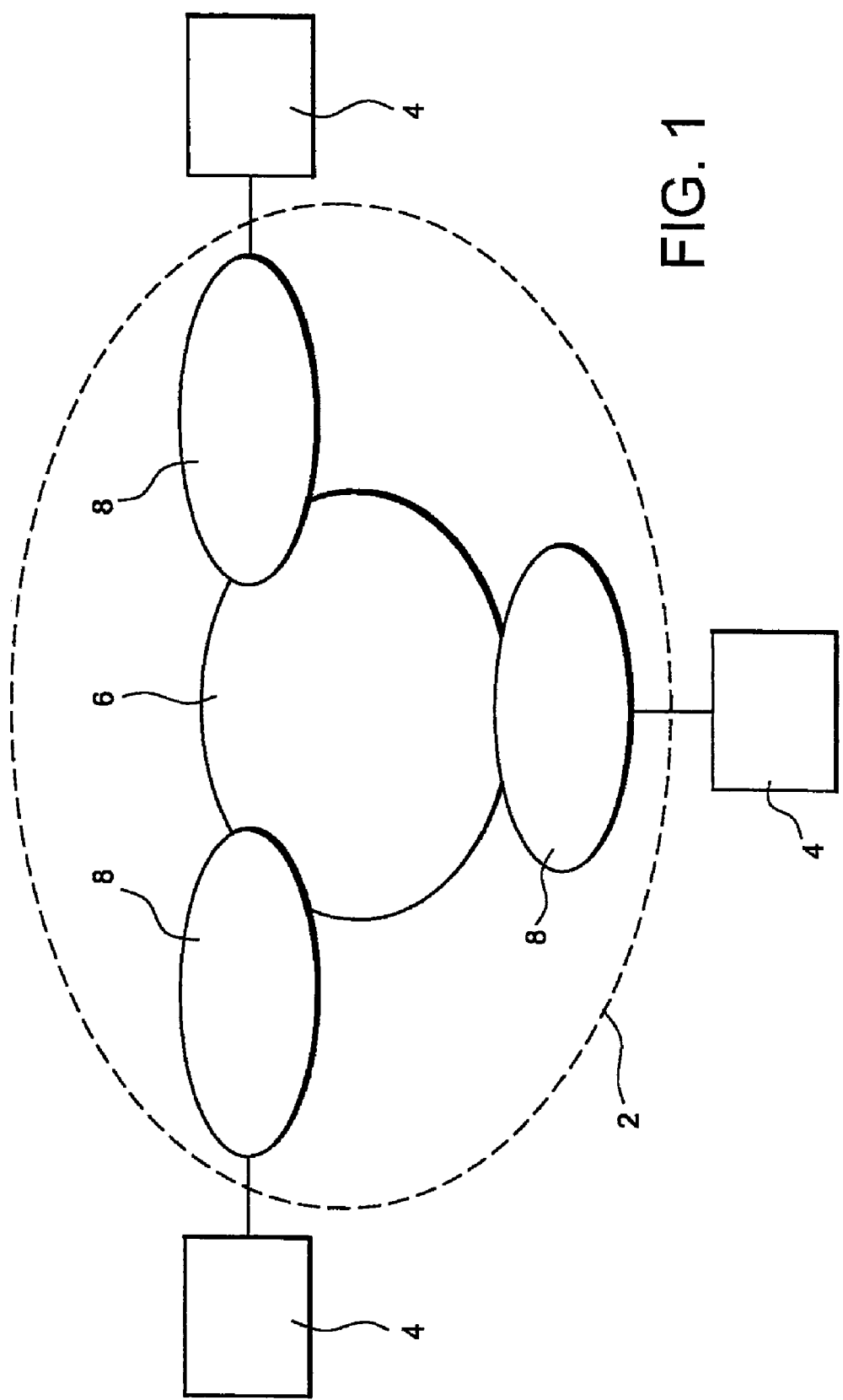
FIG. 1, shows a general diagram of a transmission network wherein is implemented the method according to the invention.
Figure 2:
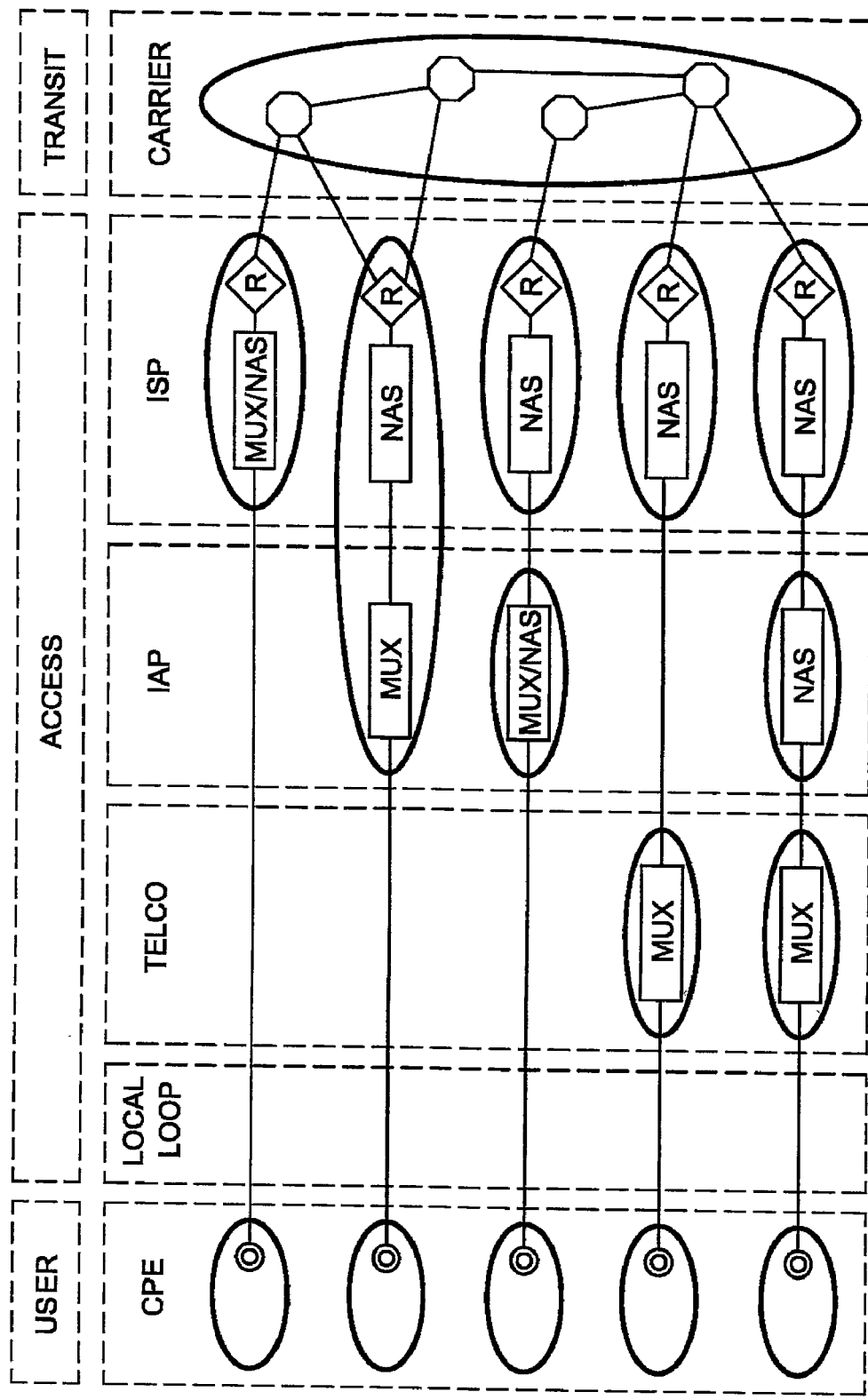
FIG. 2 shows different topologies of access networks.
Figure 3:
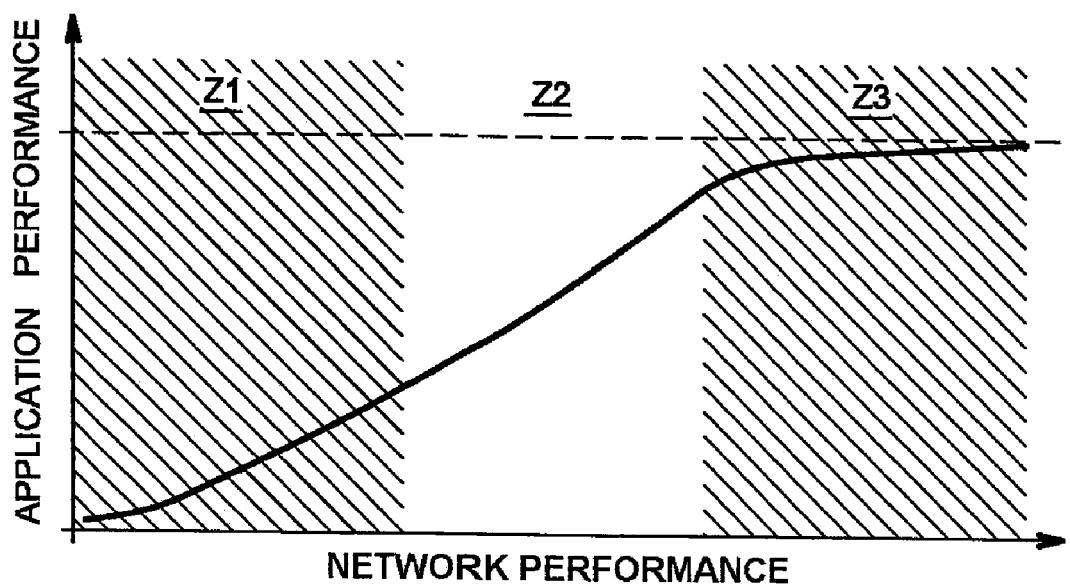
FIG. 3 shows a curve showing the performance of an application according to the performance of the network.
Figure 4:
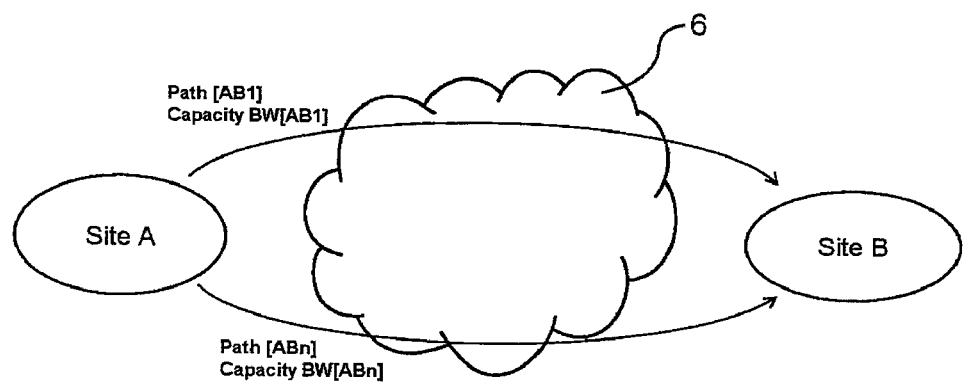
FIGS. 4 and 5 schematically show two sites A and B exchanging data via several accesses to a telecommunications network.

In reference to FIG. 4, two sites A and B connected to an interconnection network 10 are able to exchange information via n paths [AB1], [AB2], etc., [ABn]. The capacity of each of these paths is noted BW[ABi] (in bits/second), with i belonging to [1 . . . n].

Figure 5:
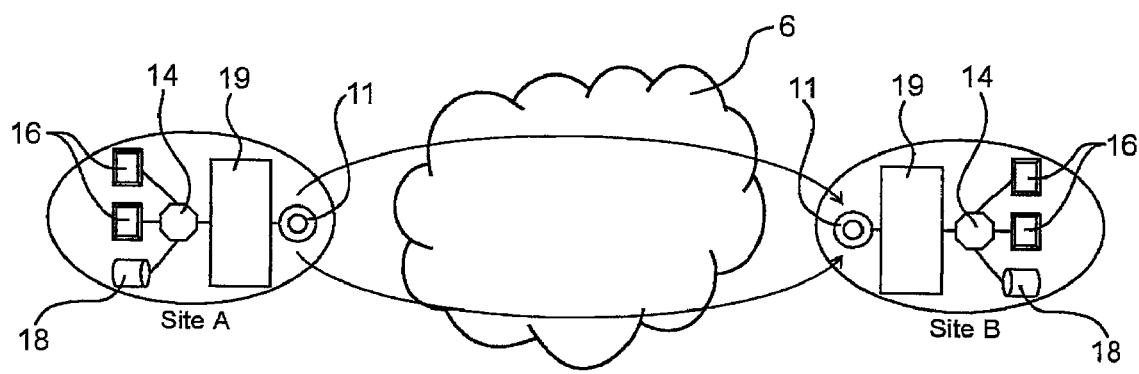

In reference to FIG. 5, each of the sites A and B comprises at least one access equipment to the network 11, at least one concentrator/switch 14, and possibly at least one work station 16, and at least one application server 18.

The work stations 16 and the servers 18 are terminals of different natures (telephones, cameras, screens, computers, storage systems, etc.) able to exchange application flows during a communication between the sites A and B.

According to the invention, each one of the sites A and B further comprises at least one router/regulator 19 programmed to optimise the distribution of the application flows on the different paths available between the sites A and B. To this effect, to each application flow is associated a set of values that characterises it: the Use, the Demand, the Constraint, and the Effective Demand of speed during the duration of the communication (transaction, telephone call, videoconference, etc.).

Use Associated with an Application Flow

According to the activity of the users, the application flows change constantly, in number, in nature and in quantity of the information exchanged.

The Use is variable over time and shows the effective use of the network by the application flows (typically as a number of binary characters-bit-per second). Its measurement is therefore objective. The Use corresponding to each flow can be in a second step classified and aggregated according to different criteria, among which:
the network topology: incoming accesses, outgoing accesses;
the typology of the flows: how many flows for each application;
the criticality of the flows: level of importance of each flow.

Demand Associated with the Application Flow

Figure 6:
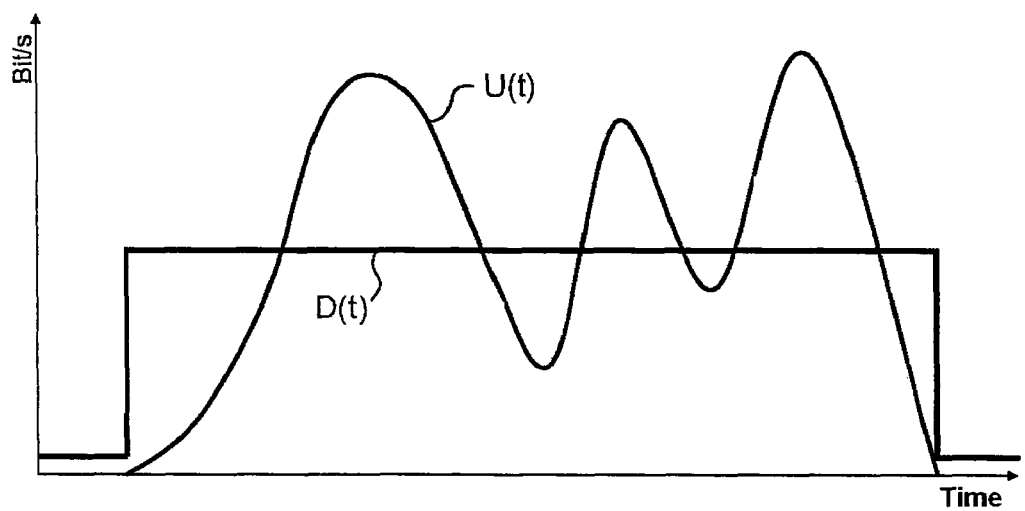
FIG. 6 shows an example of a curve showing the variation over the course of time of the Use and of the demand for speed by an application generating a flow between the sites A and B.

The Demand value is linked to the objectives associated with each application flow. This value gives the required and sufficient speed (typically in bit/s) in order for the flow to satisfy the performance objective associated with the application that is generating it. Note that the Demand is not correlated directly with the Use. In particular as is shown in FIG. 6:
the Demand can be larger than the Use since the constraints applied to the flows do not allow it to achieve its objective. In this case, it is the network that limits the speed.
the Demand can be larger than the Use because the application does not really need such a resource (for example the data to be transmitted is not numerous, and the flow does not use all of the network capacity which is offered to it). In this case, it is the application that limits the speed.
the Demand can be smaller than the Use because the network resource is sufficient, and even in excess) and that the application is elastic enough to use it. In this case, the speed can be limited by the application or by the network, but the Demand is largely serviced.

The value of the Demand associated with an application flow can be acquired by different means, for example:
by static configuration consisting in assigning beforehand a value of Demand to an application flow, and when the flow is recognised, the association with the Demand is carried out;
by signalling: the applications signal to the network their own Demand. This is the case in particular with real time flows such as telephony, for example for networks using the IP protocol. In this case, the applications signal to the network their own Demand through the RSVP protocol (for Resource ReSerVation Protocol), or the SIP protocol (for Session Initiation Protocol). In this case the association between a flow and a Demand takes the signalled value into account dynamically;
by default: in the case where there is no prior configuration and no signalling of the Demand by the application, a default value for Demand can be attributed to the flow.

In order to simplify the explanations, it is considered that as soon as the application flow is detected, its Demand is validated; when it ceases, its Demand is equal to zero.

However, the method according to the invention applies even if the Demand of a given application flow varies continuously over time.

Constraint Applied on the Application Flow

The Constraint parameter on an application flow shows the resource limitation applied by the network on the application flow in question (typically in bit/s).

The mechanism exerting the Constraint can take different forms.

In particular this mechanism can consist of:
- a simple limitation of the overall speed of the links: in this case the resource is shared in a more or less arbitrary fashion between the flows. It is mainly the behaviour of the transport protocols of the TCP, UDP, STP type, for example, when they are in direct competition. The final result then depends substantially on the network resource, the number of flows competing and their elasticity;
- a mechanism for allocating resources: in this case, a device for allocating exerts a regulation on the application flows. This constraint can be calculated and applied on the flows in diverse ways. It can also apply either on the flows taken in isolation, or on groups of flows.

By way of example of mechanisms for allocating resources, the following can be mentioned: the mechanisms for fixed or semi-fixed reservation (static configuration); the mechanisms for dynamic reservation (that analyse and process the signalling elements emitted by the application and deduce from this an estimate of the resource needed for the application flow); the adaptive mechanisms of a local scope for access or global to the network (from end to end) and which seek to dynamically distribute the resource between all of the active flows according to the situations of congestion which can arise.

As such, during a communication between the sites A and B, when the application flow is detected, its Constraint is estimated and exerted where applicable, and when the transmission of said flow ceases, its associated Constraint becomes undetermined.

According to the devices implemented, it may not always be possible to estimate the Constraint. For example, in the absence of congestion, it is possible that the only information that can be determined is that the flow is not constrained (i.e. Constraint>Usage). Note that the method according to the invention applies even if the Constraint applied to the flow varies over the course of time.

Effective Demand Associated with Application Flow

For many applications, the resource effectively consumed (excluding the constraint linked to the network) by an application flow varies considerably over time. This variation can be due to the behaviour of the communication protocols (TCP), to the phases of activity linked to the application itself, for example an application flow will consume a substantial amount of resources during the display of a new key-entry form, but little resources in the filling phase of this form by an operator. Therefore, it is not optimal to associate a constant Demand to the flow, since the Demand will be oversized in a number of situations.

Figure 7:
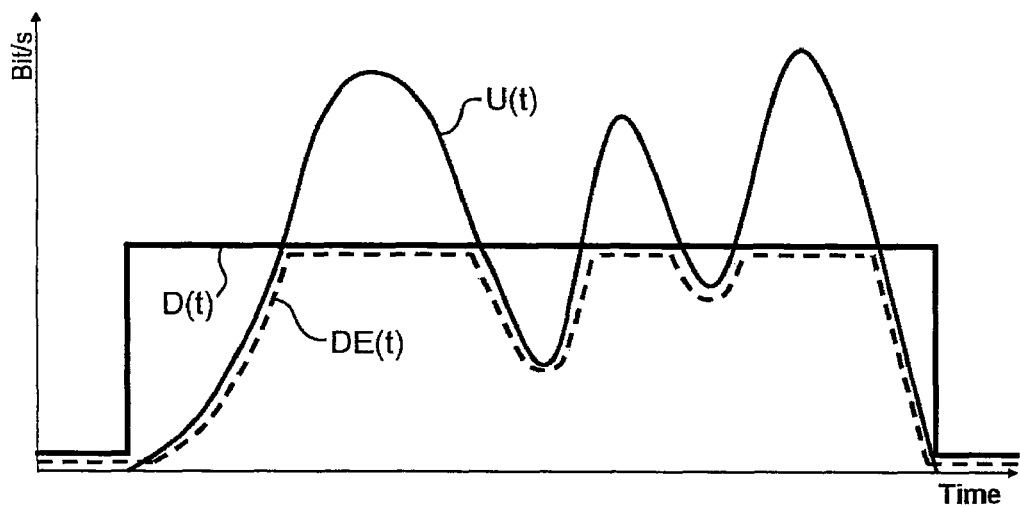
FIG. 7 shows the variation over the course of time of the Effective Demand for a non-constrained flow according to the invention.

According to a preferred embodiment of the invention, the notion of Effective Demand is introduced at the instant t (noted DE(t)) in the following manner:
- when the application flow is not constrained as shown in FIG. 7, i.e. when its speed is not limited by the network, then: Constraint(t)>Use(t), and $DE(t)=\text{Min}[\text{Use}(t);\text{Demand}(t)]$

Figure 8:
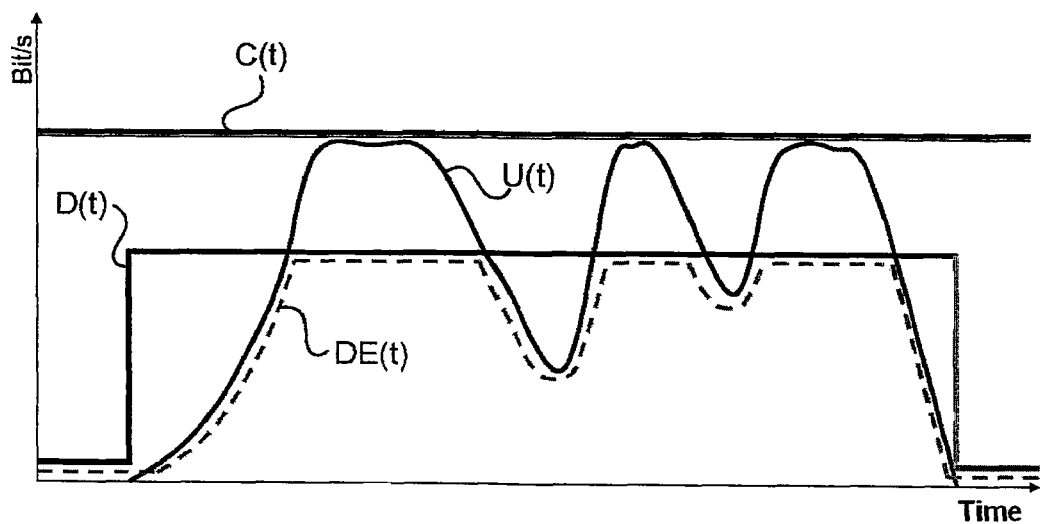
FIG. 8 shows the variation over the course of time of the Effective Demand for a flow of which the Constraint is greater than the Demand according to the invention.

- when the application flow is constrained by the network in such a way that the Constraint is greater than the demand, as is shown in FIG. 8, then: Constraint(t)>Demand(t), and $DE(t)=\text{Min}[\text{Use}(t);\text{Demand}(t)]=\text{Demand}(t)$

Figure 9:
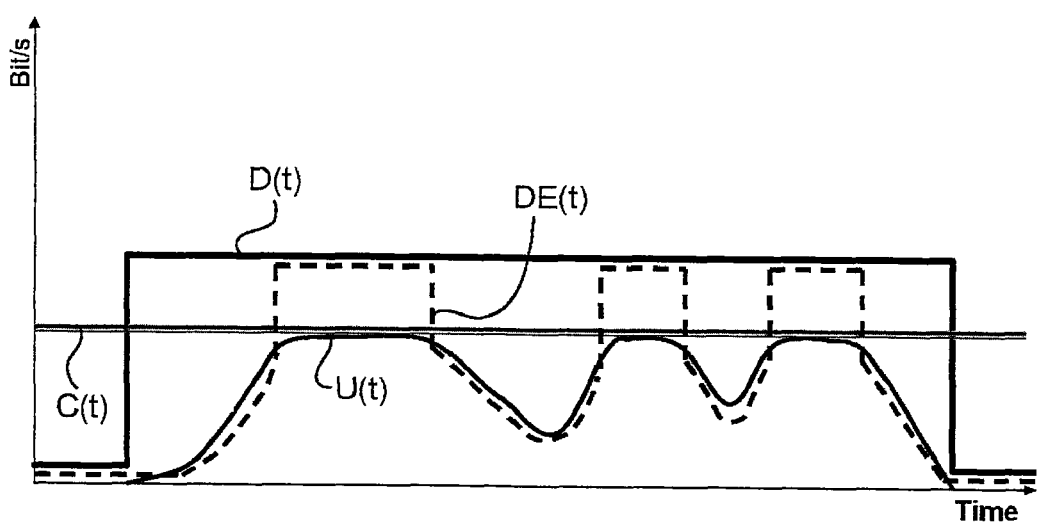
FIG. 9 shows the variation over time of the Effective Demand for a flow of which the Constraint is lower than the Demand according to the invention.

- when the application flow is constrained by the network in such a way that the Constraint is less than the demand, such as is shown in FIG. 9, then: Constraint(t)≦Demand(t), and $DE(t)=\text{Demand}(t)$ Note that the Effective Demand DE(t) is variable over time.

Effective Demand Density DDE(t)

The Effective Demand Density (DDE) on a path characterises its effective load rate, i.e. with regard to the effective demands.

The purpose of the invention is to balance the Effective Demand Densities of each path available between two sites, in such a way as to obtain the best overall output possible.

According to the invention, for a given path of total capacity BW, and taken by the application flows 1 to F, the value of the Effective Demand Density is defined at the instant t by adding the Effective Demands of each flow and by bringing the value to the total capacity of the path:

$DDE(t)=[\Sigma_{(j=1\ to\ F)}DE_j(t)]/BW$

Note that:
- DDE(t) less than 100% means that the path is underloaded, and therefore capable of accommodating new application flows while satisfying those already present,
- DDE(t) greater than or equal to 100% means that the path is overloaded, and that it cannot attribute enough resources to each flow. In this case, it is possible either to reduce the priority of certain less critical flows in order to protect others that are more critical, or to constrain all of the flows in an identical manner.

It is important to note that the notion of Effective Demand Density is different from the notion of congestion of the path. Indeed, a path can be congested, i.e., the sum of the Uses reaches its maximum capacity, while the Effective Demand Density for this path is less than 100%, in particular due to the elasticity of the flows. On the other hand, a non-congested path, i.e., for which the sum of the Uses does not reach the maximum capacity of the path, will still have an Effective Demand Density less than 100%.

Figure 10:
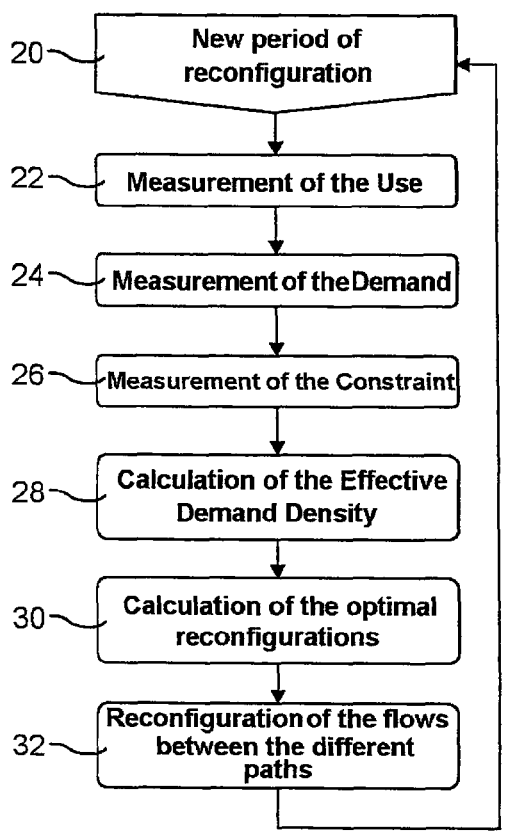
FIG. 10 shows a flow chart showing a method for optimising the distribution of the flows established on a set of shared resources according to the invention.
Figure 11:
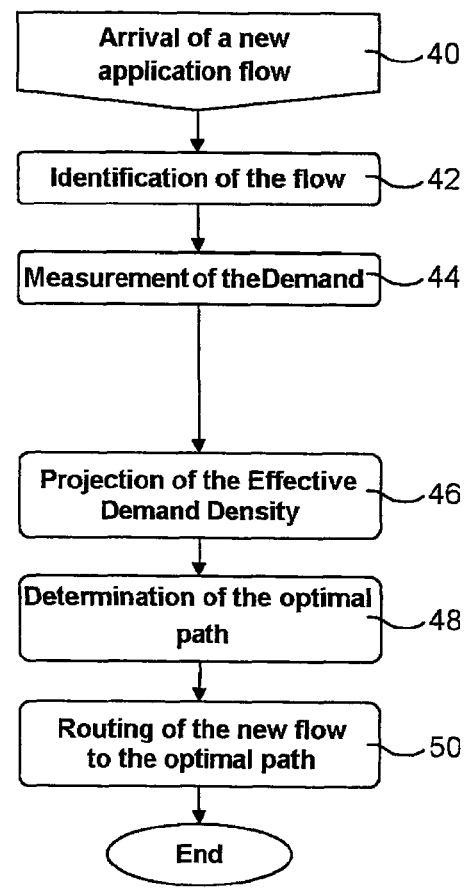
FIG. 11 shows a flow chart showing a method for routing new flows on a set of shared resources according to the invention.

The optimisation of the distribution of several application flows over the various paths available between the site A and the site B can be done either according to a continuous process in the absence of new flows (FIG. 10) or according to a discontinuous process when a new flow must be exchanged between the sites A and B (FIG. 11).

The continuous process makes it possible to periodically reconfigure the application flows between the different paths possible, while the discontinuous process makes it possible to choose the best path for a new application flow at the time of its appearance. This latter process is applied during the active passing of an application flow. It substantially entails determining on which path to route this new flow.

Other than the arrival of a new application flow, other parameters can vary on each one of the paths and influence therefore the Effective Demand Density of these paths. Among these parameters, the following can be mentioned for example:
- the stoppage of certain flows,
- the variation of the Effective Demand of certain flows (change in their activity profile), the variation of the capacity of the path (which can include up to becoming fully unavailable).

There are then two strategies possible:

do not intervene to reconfigure the flows, counting on the stoppages of the old flows (which reduces the Effective Demand Density) and on the arrival of new flows to progressively calculate a good balance;

intervene periodically by reconfiguring the various flows in order to again balance the Effective Demand Densities on the available paths.

The period of reconfiguration depends on the implementation, on the speed of variation of the different parameters and on the precision of the balance that is sought. In the current networks, a reasonable period ranges typically from a few seconds to a few minutes.

FIG. 10 schematically shows the essential steps of a continuous process.

The step 20 corresponds to the beginning of a new period of reconfiguration.

In the step 22, the router/regulator 19 determines the Use U(t) of each application flow.

In the step 24, the router/regulator 19 determines the Demand D(t) of each application flow.

In the step 26, the router/regulator 19 determines the Constraint C(t) applied to each application flow. This constraint can be applied on the router/regulator 19 itself or in an external piece of equipment, for example the access equipment to the network 11. It can take into account the nature of the flow, its criticality, etc.

In the step 28 the router/regulator 19 calculates the Effective Demand DE(t) of each application flow, then determines the Effective Demand Density DDE (t) of each path.

In the step 30 the router/regulator 19 determines the optimal reconfigurations according to the policy chosen to balance the Effective Demand Density DE(t) of each path.

According to a characteristic of the method of the invention, in order to estimate a priori the impact of the displacement of an existing flow, noted as af, from an old path of capacity noted as $BW_{ac}$ towards a new path of capacity noted as $BW_{nc}$ on the respective Effective Demand Densities of these two paths, the function ProjEff[DDE(t)] is used representing the Effective Projection of Effective Demand Density, defined as follows:

Impact on the new path:

$$\text{ProjEff}[DDE_{nc}(t)] = DDE_{nc}(t) + DE_{af}(t)/BW_{nc}$$

Impact on the old path:

$$\text{ProjEff}[DDE_{ac}(t)] = DDE_{ac}(t) - DE_{af}(t)/BW_{ac}$$

The router/regulator 19 is programmed to use one or several of the following reconfiguration criteria:

do nothing: count on the stoppage of the flows in order to decrease the Effective Demand Density and on the arrival of new flows in order to progressively approach the balance between the paths, reconfigure only the flows that have a high demand (high value of D(t)) or a high Effective Demand (high value of DE(t)), reconfigure only the flows that have a long lifespan (estimated according to the nature of the flow or according to a learning of the lifespan of similar application flows in the past).

Note that the method according to the invention can be implemented by means of algorithms similar to those implemented in order to optimise the devices for storing blocks of information of varied size (hard drives, etc.).

In the step 32, the router/regulator 19 applies any possible path modifications for each one of the application flows for which it has decided the reconfiguration.

The discontinuous process is described in FIG. 11.

The step 40 corresponds to the detection of the appearance of a new flow exchanged between the sites A and B.

In the step 42, the router/regulator 19 identifies the new flows. This task consists, on the one hand, in recognising the nature of the application of which the information is carried by this new flow, and on the other hand, in determining the destination site of this flow. This new application flow shall be noted as "nf".

In the step 44, knowing the nature of the application, the router/regulator 19 deduces from this the Demand associated with the new application flow (for example via a table configured using an external device, or by analysing the signalling elements that can accompany this flow). This demand $D_{nf}(t)$ is a priori constant during the entire life of the flow, and returns to zero when the flow ceases to be present. It can also be variable over time (for example thanks to the signalling elements). It can be noted that in this step, the effective behaviour of the new flow is not yet known.

In the step 46, the router/regulator 19 carried out a projection of the Effective Demand Density DDE(t) on all of the paths available. This entails an estimate of what would be the Effective Demand Density DDE(t) of these paths if the new application flow were to take them.

If it is supposed that the Effective Demand Density DDE(t) of each path is already determined, for example by the continuous process, the Projection of Effective Demand Density for the path at the time of the arrival of the new flow (nf) is calculated in the step 46 as follows:

$$\text{Proj}[DDE(t)] = DDE(t) + D_{nf}(t)/BW.$$

In the step 48, the router/regulator 19 determines the optimal path OP for the new application flow having the lowest value of projection of Effective Demand Density from among all of the possible paths. In the step 50, the router/regulator 19 then routes the new flow (nf) on the optimal path (OP) such as determined in the preceding step.

This routing can be carried out in various ways, according to the network technologies (transmission on a particular physical interface, tokenising of the flow with an indicator that will be used to select the interface of the access equipment, transmission of a command to a routing element located elsewhere on the path, etc.).

Note that the method according to the invention applies to groups of application flows rather than to individual flows without exiting the scope of the invention.

In this case, it suffices to replace:

the Use of an application flow U(t) with the Use of the group of flows Ug(t), the demand of an application flow D(t) with the demand of the group of flows Dg(t), the Constraint applied on an application flow C(t) with the Constraint applied on the group of flows Cg(t), the Effective Demand of an application flow DE(t) with the Effective Demand of the group of flows DEg(t), etc.

A case where it is particularly interesting to work with groups of application flows arises on networks of the MPLS type with Classes of Service, the groups being called "Behaviour Aggregate".

Also note that the criteria of the choice of the path can be supplemented according to the circumstances and the context with other parameters associated with the links available such as for example:

the level of security,
the cost,
the level of quality,
etc.

The device implementing the method according to the invention is either an access router arranged at the entry of an interconnection network, or a multiplexer arranged in the interconnection network, or a access server to the network.

The invention claimed is:

1. Method for optimising the sharing of a plurality of network resources between a plurality of data flows generated by a plurality of applications, said flows being able to take a number n of paths [ABi], i=1 to n, linking at least one site A and at least one site B in a telecommunications network (6), method characterised in that it comprises:
   a first phase consisting in determining at each instant t for each flow a value U(t) representing the use by said flow of at least one network resource from among the plurality of network resources available, a value D(t) representing the demand of network resources required and sufficient in order for the flow to satisfy a pre-established performance objective for said application, and a value C(t) representing a constraint limiting the network resource that can be attributed to the flow in question,
   a second phase consisting in:
      calculating, according to said values U(t), D(t) and C(t), a value DE(t) representing the quantity of network resources effectively required at an instant t in order to satisfy the performance objective of said flow according to the Constraint C(t), the type of application generating said flow and the type of use of said application, and in
      calculating according to the different values DE(t), and for each transmission path [ABi], i=1 to n, a value $DDE_i(t)$ representing the Effective Demand Density on said path by taking into account all of the flows exchanged between the sites A and B,
   a third phase consisting in dynamically distributing the flows generated by the different applications between the different paths [ABi], i=1 to n, according to the Effective Demand Densities $DDE_i(t)$ on the paths [ABi], i=1 to n.

2. Method set forth in claim 1, wherein, for each flow exchanged between the sites A and B, the regulation phase comprises the following steps:
   measuring the value of the Use U(t),
   determining the value of the Demand D(t),
   determining the value of the Constraint C(t),
   calculating the value of the Effective Demand DE(t),
   calculating Effective Demand densities $DDE_i(t)$ on each path [ABi], i=1 to n, taking into account all of the flows exchanged between the sites A and B,
   modifying the distribution of the flows on the paths [ABi], i=1 to n, in such a way as to balance Effective Demand Densities on the available paths.

3. Method set forth in claim 2, characterised in that the distribution of the flows between the different paths [ABi], i=1 to n, is carried out furthermore according to the level of security of each one of said paths [ABi], i=1 to n, and/or of the level of quality provided by each one of said paths [ABi], i=1 to n, and/or of the financial cost of using each one of said paths [ABi], i=1 to n.

4. Method set forth in claim 1, further comprising the following steps when a new flow that has to be exchanged between the site A and the site B appears:
   identifying the type of the application that is generating said new flow,
   determining the value D(t) initially associated with this new flow,
   carrying out a projection of the Effective Demand Density $Proj[DDE_i(t)]$ on each path [ABi], i=1 to n, in the hypothesis where the new flow would take each of said paths,
   routing the new flow towards the path having the smallest projection of Effective Demand Density $Proj[DDE_i(t)]$.

5. Method set forth in claim 4, characterised in that the distribution of the flows between the different paths [ABi], i=1 to n, is carried out furthermore according to the level of security of each one of said paths [ABi], i=1 to n, and/or of the level of quality provided by each one of said paths [ABi], i=1 to n, and/or of the financial cost of using each one of said paths [ABi], i=1 to n.

6. Method according to claim 4, characterised in that, if new flows that are to be exchanged between the sites A and B appear, the projection of Effective Demand Density for the path [ABi] at the time of the arrival of the new flow (nf) is calculated as follows:

$$Proj[DDE_i(t)] = DDE_i(t) + D_{nf}(t)/BW_i$$

$BW_i$ representing the resource shared between the applications generating the flows on the path [ABi].

7. Method according to claim 6, characterised in that, if new flows that are to be exchanged between the sites A and B appear, the projection of Effective Demand Density for the path [ABi] at the time of the arrival of the new flow (nf) is calculated as follows:

$$Proj[DDE_i(t)] = DDE_i(t) + D_{nf}(t)/BW_i$$

$BW_i$ representing the resource shared between the applications generating the flows on the path [ABi].

8. Method according to claim 1, wherein each flow exchanged between the sites A and B is an aggregate of several individual flows.

9. Method set forth in claim 8, wherein said individual flows are aggregated according to the topology of the network, and/or of the typology of the flows, and/or of the number of flows for each application, and/or of the criticality of each flow.

10. Method according to claim 1, wherein said network resource shows the global bandwidth available for exchanging flows during a communication between the sites A and B and in that the value U(t) shows the speed effectively used for transmitting a flow between the sites A and B, the value D(t) shows the speed required and sufficient in order for the flow generated to satisfy the pre-established performance objective associated with the application generating said flow, the value C(t) shows the maximum value for the speed authorised by the network for transmitting the flow in question, and the value DE(t) shows the speed effectively required by said flow according to speed limitations, the type of application generating said flow and the type of use of said application in order to satisfy the performance objective during said communication between the sites A and B.

11. Method set forth in claim 10, wherein, the value DE(t) is variable over time and is defined in the following way:
   when the resource consumed by the flow is not limited by the network:

$$DE(t) = Min[U(t), D(t)]; \text{ and}$$

when the resource consumed by the flow is limited by the network to the value C(t):

$$DE(t) = D(t).$$

12. Method set forth in claim 10, wherein for a given path [ABi], i=1 to n, of available bandwidth BWi, taken by a plurality of flows $F_j$, j=1 to F, the value of the Effective Demand Density $DDE_i(t)$ at the instant t is equal to the sum of the Effective Demands $DE_j(t)$ of each flow divided by the total bandwidth $BW_i$ of said path:

$$DDE_i(t)=[\Sigma_{(j=1 \ to \ F)}DE_j(t)]/BW_i.$$

13. Device for optimising the sharing of a plurality of network resources between a plurality of data flows generated by a plurality of applications, said flows being able to take a number n of paths [ABi], i=1 to n, linking at least one site A and at least one site B in a telecommunications network (6), device characterised in that it comprises:
- a determination module executed by a telecommunication device (19) that determines at each instant t for each flow a value U(t) representing the use per said flow of at least one network resource from among the plurality of network resources available, a value D(t) representing the demand of network resources required and sufficient in order for the flow to satisfy a pre-established performance objective for said application, and a value C(t) representing a constraint limiting the network resource attributable to the flow in question;
- a calculation module executed by the telecommunications device (19) that calculates, according to said values U(t), D(t) and C(t), a value DE(t) representing the network resource effectively required at an instant t in order for said flow to satisfy the performance objective in the presence of the Constraint C(t), of the type of the application generating said flow and of the type of use of said application, and that calculates according to the different values DE(t), and for each transmission path [ABi], i=1 to n, a value $DDE_i(t)$ representing the Effective Demand Density of said network resource on said path by taking into account all of the flows exchanged between the sites A and B; and
- a dynamic distribution module executed by the telecommunications device (19) that dynamically distributes the flows generated between the different paths [ABi], i=1 to n, according to the Effective Demand densities $DDE_i(t)$ of the paths [ABi], i=1 to n.

14. Device set forth in claim 13,
wherein the determination module comprises a module that measures the value U(t) for each flow exchanged during a communication between the site A and the site B, a module that determines the value D(t), and a module that determines the value C(t),
wherein the calculation module comprises a module that calculates the value DE(t), and a module that calculates the Effective Demand densities DDE(t) on each path [ABi], i=1 to n, by taking into account all of the flows exchanged between the sites A and B, and
wherein the dynamic distribution module distributes the flows on the paths [ABi], i=1 to n, in such a way as to balance the Effective Demand Densities of the paths available.

15. Device set forth in claim 14, characterised in that it consists of an access router arranged at the entry of an interconnection network.

16. Device set forth in claim 14, characterised in that it consists of a multiplexer arranged in the interconnection network.

17. Device set forth in claim 14, characterised in that it consists of an access server to the network.

18. Device set forth in claim 13,
wherein the determination module comprises a module that identifies a new flow exchanging information between the site A and the site B, a module that determines the value D(t) initially associated with this new flow, and
wherein the dynamic distribution module comprises a module for carrying out a projection of the Effective Demand Density on each path [ABi], i=1 to n, in the hypothesis where the new flow would take each one of said paths, and a module for routing the new flow towards the path i having the smallest projection of Effective Demand density $Proj[DDE_i(t)]$.

19. Device set forth in claim 18, characterised in that it consists of an access router arranged at the entry of an interconnection network.

20. Device set forth in claim 18, characterised in that it consists of a multiplexer arranged in the interconnection network.

21. Device set forth in claim 18, characterised in that it consists of an access server to the network.

22. A non-transitory computer readable medium including program instructions which when executed by a processor cause the processor to perform a method for the optimisation of the sharing of a plurality of network resources between a plurality of data flows generated by a plurality of applications, said flows being able to take a number n of paths [ABi], i=1 to n, linking at least one site A and at least one site B in a telecommunications network (6), the program instructions comprising:
- instructions for determining at each instant t for each flow a value U(t) representing the use by said flow of at least one network resource from among the plurality of network resources available, a value D(t) representing the demand of network resources required and sufficient in order for the flow to satisfy a pre-established performance objective for said application, and a value C(t) representing a constraint limiting the network resource that can be attributed to the flow in question, and
- instructions for:
  - calculating, according to said values U(t), D(t) and C(t), a value DE(t) representing the quantity of network resources effectively required at an instant t in order to satisfy the performance objective of said flow according to the Constraint C(t), the type of application generating said flow and the type of use of said application, and in
  - calculating according to the different values DE(t), and for each transmission path [ABi], i=1 to n, a value $DDE_i(t)$ representing the Effective Demand Density on said path by taking into account all of the flows exchanged between the sites A and B, and
- instructions for dynamically distributing the flows generated by the different applications between the different paths [ABi], i=1 to n, according to the Effective Demand densities $DDE_i(t)$ on the paths [ABi], i=1 to n.

23. The non-transitory computer readable medium set forth in claim 22, the program instructions further comprising:
- instructions for measuring the value U(t) for each flow exchanged during a communication between the site A and the site B,
- instructions for determining the value D(t),
- instructions for determining the value C(t),
- instructions for calculating the value DE(t),
- instructions for calculating the respective Effective Demand Densities $DDE_i(t)$ of each path [ABi], i=1 to n, for all of the flows exchanged between the sites A and B, instructions for distributing the flows on the paths [ABi], i=1 to n, in such a way as to balance the Effective Demands Densities on the available paths.

24. The non-transitory computer readable medium set forth in claim 22, the program instructions further comprising:
instructions for identifying a new flow to be exchanged between the site A and the site B,
instructions for measuring the value D(t) initially associated with this new flow,
instructions for calculating a projection of the Effective Demand Density Proj[$DDE_i(t)$] of each path [ABi], i=1 to n, in the hypothesis where the new flow would take each one of said paths,
instructions for routing the new flow towards the path i having the smallest projection of the Effective Demand Density Proj[$DDE_i(t)$].

* * * * *